(12) United States Patent  
Walessa

(10) Patent No.: US 10,286,901 B2  
(45) Date of Patent: May 14, 2019

(54) MAP OF THE SURROUNDINGS FOR DRIVING AREAS WITH RANDOM ALTITUDE PROFILE

(71) Applicant: Bayerische Motoren Werke Aktiengesellschaft, Munich (DE)

(72) Inventor: Marc Walessa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 138 days.

(21) Appl. No.: 15/349,038

(22) Filed: Nov. 11, 2016

(65) Prior Publication Data

US 2017/0057495 A1 Mar. 2, 2017

Related U.S. Application Data

(63) Continuation of application No. PCT/EP2015/059178, filed on Apr. 28, 2015.

(30) Foreign Application Priority Data

May 13, 2014 (DE) .................. 10 2014 208 967

(51) Int. Cl.
*B60W 30/06* (2006.01)
*B60W 50/02* (2012.01)
(Continued)

(52) U.S. Cl.
CPC ............ *B60W 30/06* (2013.01); *B60W 40/06* (2013.01); *B60W 50/029* (2013.01);
(Continued)

(58) Field of Classification Search
CPC .... B60W 30/06; B60W 40/06; B60W 50/029; B60W 2420/52; B60W 2550/14;
(Continued)

(56) References Cited

U.S. PATENT DOCUMENTS

| 8,565,958 | B1 | 10/2013 | Montemerlo et al. |
| 2003/0099377 | A1 | 5/2003 | Hanawa |

(Continued)

FOREIGN PATENT DOCUMENTS

| DE | 699 37 699 T2 | 11/2008 |
| DE | 10 2009 022 278 | 1/2010 |

(Continued)

OTHER PUBLICATIONS

International Search Report (PCT/ISA/210) issued in PCT Application No. PCT/EP2015/059178 dated Aug. 6, 2015, with English translation (six (6) pages).

(Continued)

*Primary Examiner* — Rodney A Butler
(74) *Attorney, Agent, or Firm* — Crowell & Moring LLP

(57) ABSTRACT

A method makes available a map of obstacles in the surroundings for a vehicle. An initial map of the surroundings which is divided into cells, each of which is assigned an occupation probability and an obstacle altitude. A ground altitude for each cell of the initial map is determined on the basis of the altitudes in the initial map by smoothing the altitudes. A corrected altitude of the obstacles for each cell of the map of obstacles is determined on the basis of the ground altitude determined for the corresponding cell of the initial map and the altitude of the obstacles assigned to the corresponding cell of the initial map. A respective occupation probability is determined on the basis of the occupancy probability assigned to the corresponding cell of the initial map. The map of obstacles in the surroundings is made available.

11 Claims, 4 Drawing Sheets

(51) Int. Cl.
| | | |
|---|---|---|
| *B60W 40/06* | (2012.01) | |
| *G01S 17/42* | (2006.01) | |
| *G01S 17/89* | (2006.01) | |
| *G01S 7/48* | (2006.01) | |
| *G06K 9/00* | (2006.01) | |
| *B60W 50/029* | (2012.01) | |
| *G01S 17/93* | (2006.01) | |

(52) U.S. Cl.
CPC ............ *G01S 7/4808* (2013.01); *G01S 17/42* (2013.01); *G01S 17/89* (2013.01); *G01S 17/936* (2013.01); *G06K 9/00805* (2013.01); *B60W 2420/42* (2013.01); *B60W 2420/52* (2013.01); *B60W 2550/10* (2013.01); *B60W 2550/14* (2013.01)

(58) Field of Classification Search
CPC ........... B60W 2420/42; G06K 9/00805; G01S 17/42; G01S 17/89; G01S 7/4808; G01S 17/936
See application file for complete search history.

(56) References Cited

U.S. PATENT DOCUMENTS

| | | | |
|---|---|---|---|
| 2006/0025888 A1* | 2/2006 | Gutmann | ........... G06K 9/00664 |
| | | | 700/245 |
| 2007/0280528 A1* | 12/2007 | Wellington | .......... G05D 1/0274 |
| | | | 382/154 |
| 2011/0054689 A1* | 3/2011 | Nielsen | ................ G05D 1/0088 |
| | | | 700/258 |
| 2011/0282581 A1 | 11/2011 | Zeng | |
| 2012/0053755 A1 | 3/2012 | Takagi | |
| 2013/0030685 A1 | 1/2013 | Goetting | |
| 2017/0357267 A1* | 12/2017 | Foster | .................. G05D 1/0088 |

FOREIGN PATENT DOCUMENTS

| | | |
|---|---|---|
| DE | 10 2010 006 828 A1 | 8/2011 |
| DE | 10 2011 100 927 A1 | 12/2011 |
| DE | 10 2011 081 740 A1 | 3/2012 |
| DE | 10 2011 054 852 A1 | 1/2013 |
| DE | 10 2012 214 307 A1 | 2/2014 |
| GB | 2507152 A | 4/2014 |
| WO | WO 2011/066602 A1 | 6/2011 |

OTHER PUBLICATIONS

German-language Written Opinion (PCT/ISA/237) issued in PCT Application No. PCT/EP2015/059178 dated Aug. 6, 2015 (six (6) pages).

German Search Report issued in counterpart German Application No. 10 2014 208 967.0 dated Dec. 9, 2014, with partial English translation (thirteen (13) pages).

Jesse Himmelstein et al., "Efficient Architecture for Collision Detection between Heterogeneous Data Structures Application for Vision-Guided Robots", 2008 10th Intl. Conf. on Control, Automation, Robotics and Vision, Dec. 17-20, 2008, XP31433641A, pp. 522-529.

* cited by examiner

MAP OF THE SURROUNDINGS FOR DRIVING AREAS WITH RANDOM ALTITUDE PROFILE

CROSS REFERENCE TO RELATED APPLICATIONS

This application is a continuation of PCT International Application No. PCT/EP2015/059178, filed Apr. 28, 2015, which claims priority under 35 U.S.C. § 119 from German Patent Application No. 10 2014 208 967.0, filed May 13, 2014, the entire disclosures of which are herein expressly incorporated by reference.

BACKGROUND AND SUMMARY OF THE INVENTION

The invention relates to a method for providing an obstacle local terrain map for a vehicle.

It is currently known to capture the local terrain of a vehicle using sensors, such as cameras, lidar, radar or ultrasound. The measurements are frequently represented in a local terrain map (sometimes also referred to as a grid), which comprises cells to which sections of the local terrain (for example 8 cm×8 cm) of the vehicle are assigned. The representation is frequently done by way of indicating with which probability the section of the local terrain which is assigned to the respective cell is occupied by an obstacle. For this reason, this type of local terrain map is also frequently referred to as an occupancy grid. Starting from the local terrain map, many driver assistance systems such as adaptive cruise control (ACC), highly automated driving or emergency brake assist can be realized.

The rule here is that grid-based approaches for local terrain modeling are classically used for "driving" driver assistance functions (for example ACC) and are not used within the parking and parking-maneuvering fields. For "driving" functions, for example on the highway, there is generally an assumption that a planar drivable surface within the capturing range of the sensors or the size of the grid used is present.

When entering the measured distance values of a sensor (for example laser scanner), a distinction must typically be made between actual obstacles above the drivable surface and measurement values on the drivable surface itself. The latter must not be entered into the grid as an actual obstacle. This distinction cannot always be made by the sensor.

The distinction between driving surface and obstacle in this case is typically made on the assumption of an approximately planar drivable surface and simple threshold value formation: All measurement values below a specific height (for example less than 0.2 m) are considered to be assigned to the driving surface and correspondingly not entered in the grid as an obstacle.

However, in particular for parking and parking-maneuvering functions, the assumption of a planar drivable surface frequently does not apply. With respect to the distinction known in the prior art between ground surface and obstacle, for example when approaching an upwardly sloping ramp, at least part of the ramp is identified as an obstacle. This results in the creation of ghost obstacles in places on the road which are actually capable of being driven on. The function of driver assistance functions in this case is strongly limited or erroneous.

DE 10 2011 100 927 A1 describes, among others, the calculation of a segmented, not necessarily flat ground surface based on 3D laser measurements. However, the calculation of the ground surface is based on the sensor measurement values in the form of a point cloud. This method requires a lot of outlay in terms of calculation and storage owing to the use of point measurement values and the real-time demands. With respect to the calculation and memory capacities that are expected of production vehicles nowadays and in the near future, there is currently no expectation that the method proposed there can be carried out in real time. For this reason, it cannot serve as a basis for driver assistance functions either.

U.S. Pat. No. 8,565,958 B1 proposes a cell-based evaluation of sensor measurement values. Here, the respectively lowest height value in a cell is interpreted as the ground value. All height values with a height below a threshold value are intended for ground calculation in the respective cell. This method presupposes that extensive measurement data is available for each cell. Practice has shown that frequently no measurement values are available for major parts of the local terrain. Furthermore, this method for ground determination also operates on individual measurement values of the point cloud. As already explained above, it is currently assumed that such a method is not capable of being performed in real time owing to the expected limited calculation and memory capacities in vehicles.

The invention is therefore based on the object of permitting, in the cases where calculation and memory capacity is limited, the creation of a local terrain map such that correct obstacle identification is possible even in the case of non-planar driving surfaces.

This and other objects are achieved by the method according to the invention, which provides an obstacle local terrain map for a vehicle, specifically a local terrain map which is divided into cells to which in each case an occupancy probability and a corrected obstacle height are assigned. The method includes: providing a starting local terrain map, specifically a local terrain map which is divided into cells to which in each case an occupancy probability and an obstacle height are assigned; for each cell of the starting local terrain map: determining a ground height based on the obstacle heights of the starting local terrain map, wherein the ground height is ascertained by way of smoothing obstacle heights of the starting local terrain map; for each cell of the obstacle local terrain map: determining the corrected obstacle height based on the ground height that was determined for the corresponding cell of the starting local terrain map and on the obstacle height that was assigned to the corresponding cell of the starting local terrain map; determining the respective occupancy probability based on the occupancy probability that was assigned to the corresponding cell in the starting local terrain map; providing the obstacle local terrain map. The starting local terrain map can comprise fewer cells than the obstacle local terrain map, and the starting local terrain map can be part of a larger local terrain map. The height of the ground is here also understood to be an obstacle height.

The method operates with obstacle heights rather than the individual measurements by the sensors, i.e. the point cloud. The obstacle heights are gathered from an evaluation of individual measurements by the sensors which are assigned to a cell. The number of data items is thus reduced compared to the point cloud, and permits, given the expected calculation and memory capacities of typical production vehicles (passenger vehicles), the method to be performed in real time and thus to be used by driver assistance systems. The correction of the obstacle height is performed based on a plurality of obstacle heights of the starting local terrain map and is realized by way of smoothing these values.

The smoothing can be achieved by way of what is known as a pyramid approach, where obstacle heights of neighboring cells are pooled, for example by way of selecting the minimum of the obstacle heights or by way of a (weighted) average. The smoothing can also be carried out with the aid of wavelets or by way of a multiscale approach.

Typically, if the obstacle height that is assigned to the corresponding cell of the starting local terrain map does not differ in terms of a predefined criterion from the ground height that is assigned to the corresponding cell of the starting local terrain map, a value representing the ground is determined for the corrected obstacle height. The defined criterion is, in particular, a height difference between the obstacle height and the ground height according to the starting local terrain map, for example 0.1 m; 0.25 m or 0.3 m.

The difference between the obstacle height of the starting local terrain map and the corresponding ground height is thus considered in the determination of the corrected obstacle height. If said difference is below a threshold value, an obstacle height that represents the ground is assigned to the cell.

The smoothing advantageously takes into consideration obstacle heights of cells of the starting local terrain map which border the cell for which ground height is determined. This approach utilizes the fact that sensors can identify substantially only the front of an obstacle. The major portion of the measurement values and of the obstacle heights of the cells will therefore relate to the measurement of the ground. That means the smoothing is determined substantially by the obstacle heights of those cells that represent local terrain sections in which the road is located. This effect can furthermore be ensured by the smoothing giving dominance to the minimum value of neighboring obstacle heights with respect to greater obstacle heights.

Typically, the ground height is not determined individually for each cell. Instead, in an additional step of the method, a ground surface for all cells of the starting local terrain map is determined: determining a ground surface based on a smoothing of all, or at least a plurality of, obstacle heights of the starting local terrain map. Starting from this ground surface, the ground height in the respectively considered cell is then determined. The ground surface can be given by way of a mathematical representation (for example using reference points), or in fact as a point curve or a point surface.

The ground surface frequently at least partially represents a sloped planar surface and/or a transition between different planar surfaces. The method thus permits correct identification of obstacles even in cases where the vehicle is located for example in front of the start of an upwardly sloping drivable ramp.

In many cases, the sensor measurements will not be able to identify objects or the ground in the associated local terrain sections of each cell, or will not be able to identify them in a sufficient number, with the result that information relating to the height of objects identified there is not available for each cell. For cells in which no information is available relating to the height of objects located there or of the ground, the height information can be set to a previously defined error value. In other words, the obstacle heights of the starting local terrain map and the corrected obstacle heights can in each case also assume an error value which represents that no decisive measurement for the obstacle height is available for the respective cell. In this case, the corrected obstacle height of the corresponding cell of the obstacle local terrain map also assumes this error value.

In one advantageous embodiment, the cells of the obstacle local terrain map represent in each case the same region of the local terrain as the cells of the starting local terrain map. The geometric representation by way of obstacle local terrain map and starting local terrain map is therefore identical.

In a typical implementation, the method furthermore comprises: providing obstacle point measurements which in each case describe the three-dimensional spatial position of a point in the local terrain of the vehicle that was identified as an obstacle; ascertaining the starting local terrain map based on the obstacle point measurements. The sensors of the vehicle, for example lidar sensors or a camera with structure from motion processing, which is known in the prior art, supply the three-dimensional position of points in the local terrain (also on the ground) which were identified, i.e. a 3D point cloud. These identified points are here referred to as obstacle points (and typically also include points on the ground). The individual obstacle points are then assigned to the cells of the starting local terrain map which is previously defined. The assignment is typically effected on the basis of the x/y-coordinates of the obstacle points (i.e. the 2D position of the points, which does not take into account the height information) in comparison with the sections of the local terrain that are represented by cells. As a result, typically a plurality of (for example 5 to 50) obstacle points are assigned to each cell. In order to determine the obstacle height for the respective cell, the height information of the 3D position of the obstacle points is evaluated (z-component). Typically, the obstacle height is determined on the basis of one or more of the following criteria: maximum height information of the obstacle points assigned to a cell; variance of the height information of the obstacle points assigned to a cell; difference between minimum height information and maximum height information of the obstacle points assigned to a cell.

In addition to the obstacle height, what is furthermore determined for each cell is also an occupancy probability which is obtained, in particular, from the number of obstacle points which are assigned to a cell. Here, linear assignment of the number of obstacle points in a cell to an occupancy probability can be effected (with an upper limit, starting from which the occupancy probability is 100%).

Another aspect of the invention relates to a control unit for a vehicle, comprising memory, a microprocessor and electronic interfaces, wherein the control unit is adapted to carry out one of the methods illustrated above. The electronic interfaces can be adapted to establish communication links to sensors of the vehicle and driver assistance systems.

The invention permits the use of grid-based approaches of local terrain capturing with distance-indicating sensor systems also in the parking and parking-maneuvering field when driving on uneven driving surfaces of any shapes which can frequently be found there. It is thus possible to use the advantages of the grid-based approaches even for this use in a favorable manner, which previously was not possible or only to a limited extent. In addition, the illustrated method permits the future use of a common grid for "driving" and "parking," in which even the "driving" functions are no longer bound to the assumption of a continuous flat plane.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference signs relate to corresponding elements throughout the figures.

DETAILED DESCRIPTION OF THE DRAWINGS

Figure 1:
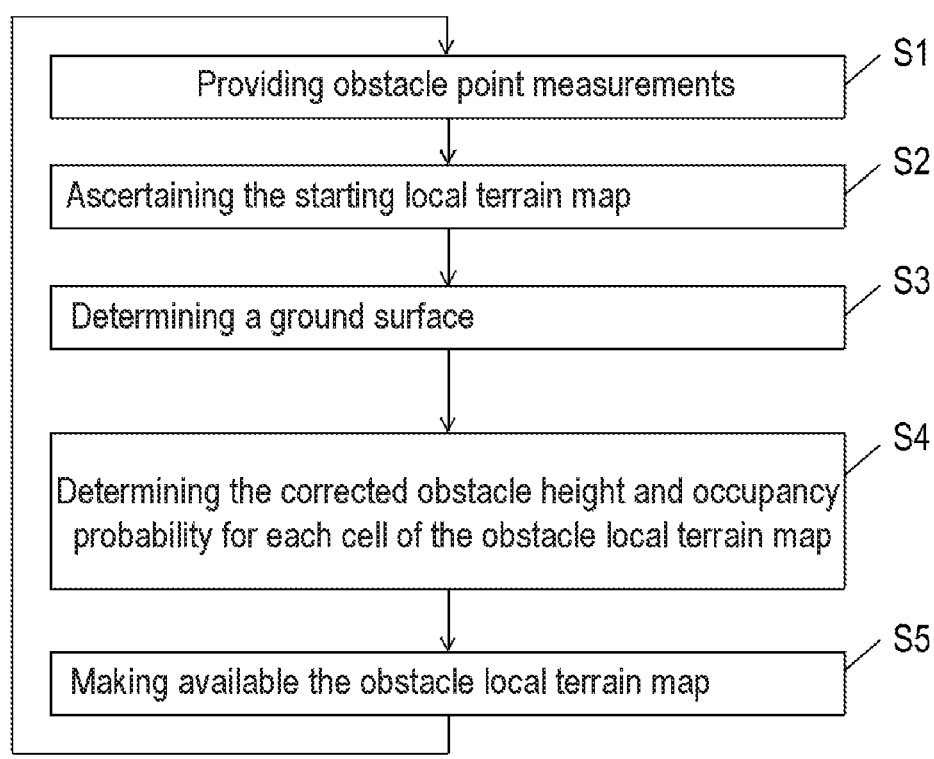
FIG. 1 is a flowchart for providing an obstacle local terrain map according to one exemplary embodiment of the invention.

FIG. 1 is a flowchart for providing an obstacle local terrain map according to one exemplary embodiment. In a first step S1, obstacle point measurements are provided. The sensors of the vehicle check the local terrain of the vehicle in a point-wise fashion and identify at which point position an obstacle is located (here also with respect to the ground). The positions of the points which are checked can be random and depend on the identifiability of the local terrain at these points. The sensors (and connected preprocessing) deliver as a result the three-dimensional position of points at which obstacles were identified (obstacle points).

In a step S2, these obstacle point measurements are assigned in each case to a cell of the starting local terrain map. The starting local terrain map and its division into cells are provided according to a predefinition which can also take into consideration the current driving situation of the vehicle (parking, driving on a highway, driving through town, etc). The assignment of the obstacle point measurements to cells depends on in which section of the local terrain that is represented by a cell is the obstacle point measurement located. Since the sections of the local terrain are typically selected such that they have a rectangular base area and perpendicular "walls," the assignment can be effected on the basis of x/y-coordinates (i.e. without taking into account the measured height of the obstacle point).

Furthermore, the height information of the obstacle points assigned to a cell is consolidated in step S2. This is done by evaluating the minimum and maximum values of the height information and the variance of the height information of the assigned obstacle points. As a result, an obstacle height is assigned to a cell. In addition, an occupancy probability is determined for the cell, which occupancy probability is obtained from the number of obstacle point measurements which are assigned to a cell. If no obstacle point measurements or only an insufficient number of obstacle point measurements are assigned to a cell, this cell can also be assigned a value for the obstacle height and the occupancy probability which indicates that no statements can be made regarding this cell.

In a step S3, a ground surface is determined for the starting local terrain map. To this end, the obstacle heights of the starting local terrain map are smoothed. An exemplary method in this respect is explained with reference to FIG. 2. A schematically illustrated starting local terrain map 20 contains 16 cells, four of which are illustrated on the top left in detail. These cells were assigned the obstacle heights 2, 1, 2 and –, with – representing a value that indicates that no statement regarding obstacle height and occupancy can be made for this cell.

Figure 2:
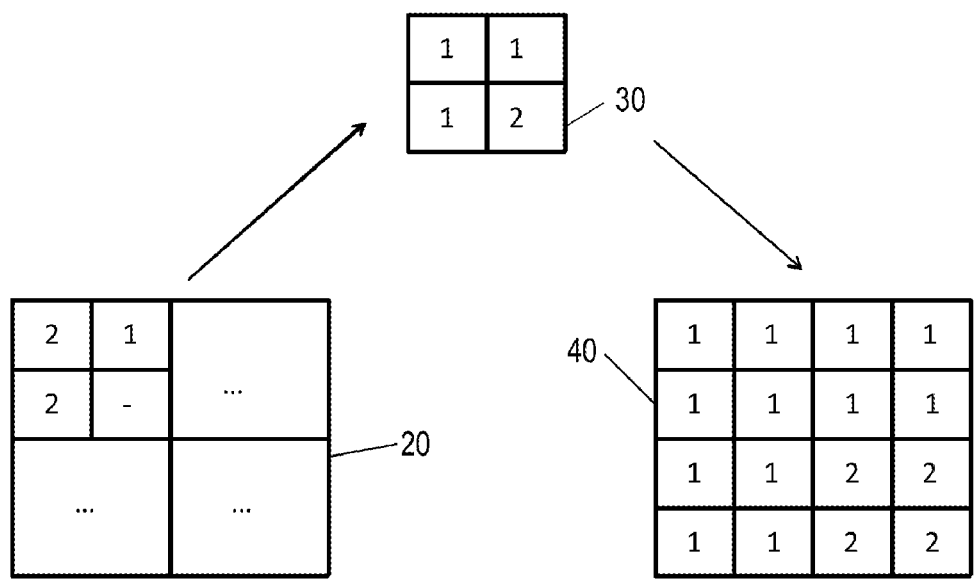
FIG. 2 schematically shows the determination of the ground surface for a starting local terrain map according to one exemplary embodiment.

In a first step, the obstacle heights of in each case four neighboring cells are merged to form one value. This merging is carried out such that the resulting value represents the minimum of the merged obstacle heights, wherein obstacle heights which make no statement (–) are not included. For example, the four obstacle heights illustrated in the starting local terrain map 20 are merged to give a value "1," which is entered into the matrix 30 which is produced top left. The values of the remaining cells of the starting local terrain map 20 are assumed to be such that the values shown in the matrix 30 are produced. In order to obtain the smoothed ground surface, the calculated values are backpropagated, as a result of which the ground surface matrix 40 is obtained. In the process, each value of the matrix 30 is assigned four neighboring cells as obstacle height. The value "1" of the left-hand top cell of the matrix 30 is thus assigned to the four neighboring cells top left in the ground surface matrix 40, the value "2" to the four cells bottom right, and so on. In this way, a ground height for each cell of the starting local terrain map is determined. This is the value which is assigned to the cell of the ground surface matrix 40, which corresponds in its arrangement to the cell of the starting local terrain map 20. The method explained with reference to FIG. 2 is also referred to as the pyramid approach.

These methods of smoothing and determining ground surfaces are carried out on the basis of the consolidated values of the obstacle point measurements, specifically the obstacle heights. Owing to the reduced number of values to be processed, the method can, given the expected calculation and memory capacity in future vehicles, be carried out in real time.

Figure 3A:
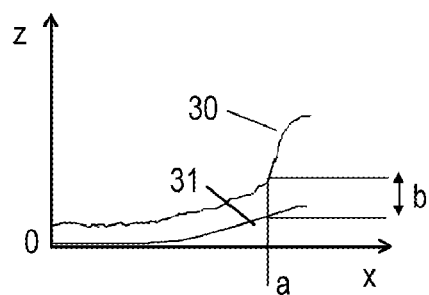
FIGS. 3A and 3B schematically show the determination of the corrected obstacle height for a one-dimensional observation according to one exemplary embodiment.
Figure 6:
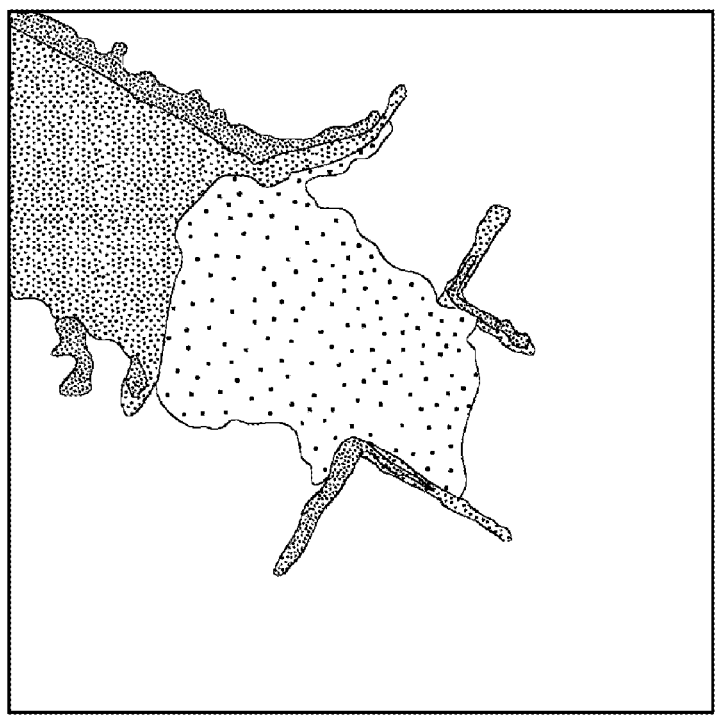
FIG. 6 schematically shows an interpolated starting local terrain map for the starting local terrain map according to FIG. 4B according to one exemplary embodiment.

In a next step S4, the corrected obstacle height is determined based on the ground surface matrix and the starting local terrain map. The process in this respect is described with reference to FIGS. 3A and 3B. FIG. 3A schematically shows the curved profile 30 of the obstacle heights of cells in the x-direction of a starting local terrain map. The obstacle heights are also referred to as z-coordinates. Provision is made in some implementations for the starting local terrain map to be interpolated in an intermediate step, for example using a modified pyramid approach with low-pass filtering, and for the method according to step S4 to be carried out based on this interpolation. This may make sense if many cells of the starting local terrain map cannot be assigned obstacle heights based on sufficient measurements (sparsely occupied starting local terrain map). FIG. 6 shows, by way of example, such an interpolated starting local terrain map for the starting local terrain map according to FIG. 4A.

Figure 3B:
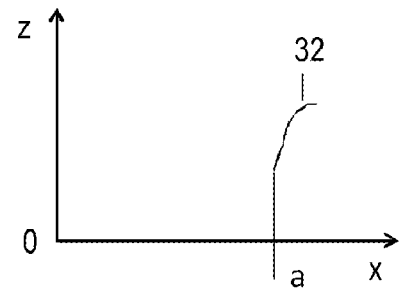

It is assumed here that the number of cells is of a size such that the individual steps cannot be seen in the curve 30, and the curve 30 therefore appears to be continuous. The reference sign 31 designates the curve of the ground heights which were determined for the corresponding cells of the starting local terrain map. To determine the corrected obstacle heights, the height difference between the respective ground height and the obstacle height of the starting local terrain map is considered. If said height difference exceeds a threshold value b (for example 25 cm), it can be seen that it is an obstacle. The corrected obstacle height is either 0, or the value for the ground height, when the height difference does not exceed the threshold value b. Otherwise, the corrected obstacle height is the obstacle height as is indicated in the starting local terrain map. In the example of FIG. 3A, the height difference is exceeded at point x=a. FIG. 3B shows the curved profile 32 of the corrected obstacle heights of the obstacle local terrain map. Up to point x=a, the curve of the corrected obstacle heights is at z=0. At point x=a, the curve 32 follows the values of the obstacle heights of the starting local terrain map.

Finally, the calculated obstacle local terrain map is made available in a step S5.

Figure 4A:
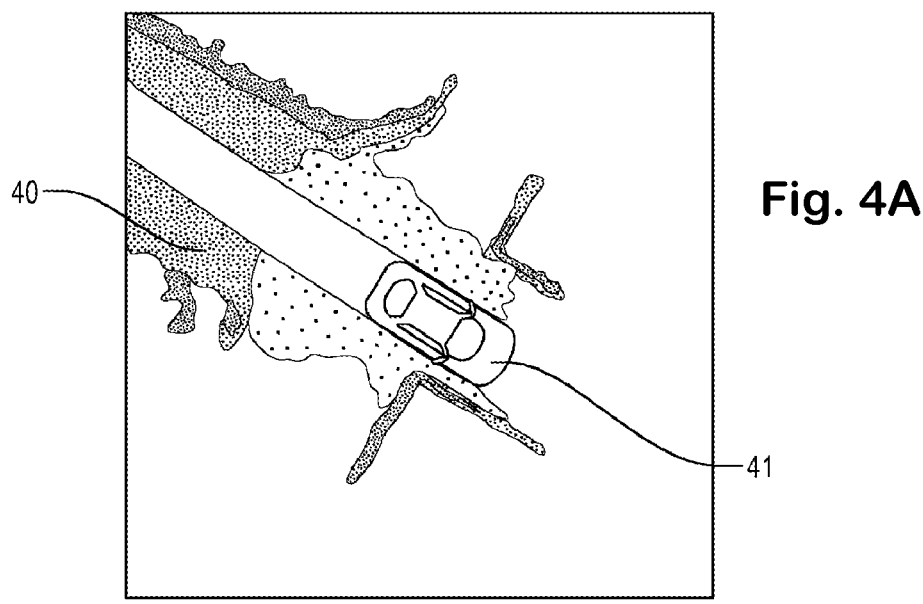
FIG. 4A schematically shows a starting local terrain map according to one exemplary embodiment.

FIG. 4A schematically shows a starting local terrain map according to one exemplary embodiment. A vehicle 41 is located at the foot of an upwardly sloping ramp which extends from the vehicle 41 to the top left in the direction of the region 40. The vehicle is located in the intersection region of two intersecting drivable paths and is driven from top left to its illustrated position. The density of the illustrated points in the areas shows the obstacle heights that were ascertained for cells in the area. The denser the illustrated points, the greater the identified obstacle height. The illustrated points do not themselves represent the obstacle points. The obstacle heights identified in the region 40 have height values which are above a threshold value used in the prior art to differentiate ground and obstacle. In other words, the region 40 would be identified as an obstacle in the prior art, even though it is a drivable ramp.

Figure 4B:
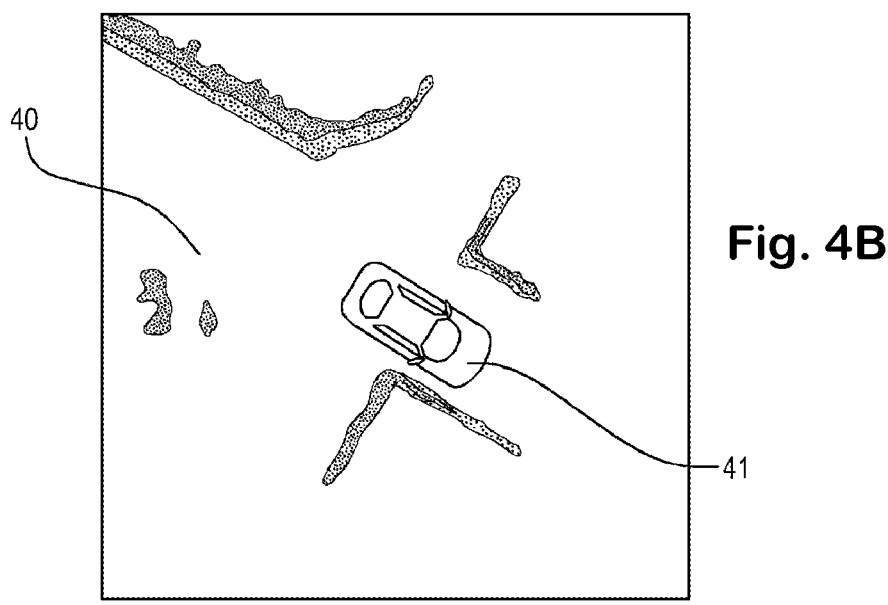
FIG. 4B schematically shows an obstacle local terrain map according to one exemplary embodiment.

FIG. 4B schematically illustrates an obstacle local terrain map with corrected obstacle heights, as is produced after exemplary use of the method according to the invention. As can be seen, the region 40 is no longer identified as an obstacle. Consequently, driver assistance systems which are based on the provided obstacle local terrain map can correctly perform their function even in the region of the exemplary ramp.

Figure 5:
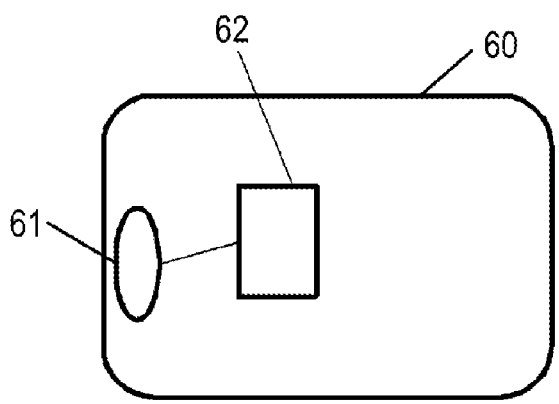
FIG. 5 schematically shows a vehicle having the system according to the invention according to one exemplary embodiment.

FIG. 5 schematically illustrates a vehicle having a control unit according to one exemplary embodiment. A vehicle 60 includes a control unit 62 with a microprocessor and memory. Furthermore, the vehicle 60 includes a camera 61, which continuously makes available recordings of the environment of the vehicle 61. Using what is known as a "structure from motion" method, known in the prior art, obstacle point measurements, which are used as the basis of the above-mentioned method, for the performance of which the control unit 62 is set up, are made available from the continuous recordings by the camera 61 and information for propelling the vehicle (for example from wheel sensors). The calculated obstacle local terrain map is made available to driver assistance functions in the vehicle.

The invention permits the use of grid-based approaches of the local terrain capturing using distance-providing sensor systems even in the parking and parking-maneuvering field when driving on uneven driving surfaces as occur frequently here and which may have any shape. It is thus possible to use the advantages of the grid-based approaches in a favorable way even for these use cases, which was previously not possible, or possible only to a limited extent. In addition, the illustrated method permits the future use of a common grid for "driving" and "parking," in which the "driving" functions are also no longer bound to the assumption of planarity. Moreover, the nature of the ground surface and thus of the ground heights can be arbitrary and are not subject to any limiting model assumptions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing an obstacle local terrain map for a vehicle, the obstacle local terrain map being divided into cells to which in each case an occupancy probability and a corrected obstacle height are assigned, the method comprising the acts of:
providing a starting local terrain map that is divided into cells to which in each case an occupancy probability and an obstacle height are assigned;
for each cell of the starting local terrain map:
determining a ground height based on the obstacle heights of the starting local terrain map, wherein the ground height is ascertained by smoothing the obstacle heights of the starting local terrain map;
for each cell of the obstacle local terrain map:
determining a corrected obstacle height based on the ground height determined for the corresponding cell of the starting local terrain map and based on the obstacle height that is assigned to the corresponding cell of the starting local terrain map;
determining the respective occupancy probability based on the occupancy probability assigned to the corresponding cell of the starting local terrain map; and
making available the obstacle local terrain map for use by the vehicle.

2. The method according to claim 1, wherein
a value representing the ground is determined for the corrected obstacle height if the obstacle height that is assigned to the corresponding cell of the starting local terrain map does not differ in terms of a predefined criterion from the ground height that is assigned to the corresponding cell of the starting local terrain map, wherein the criterion is a height difference between the obstacle height and the ground height according to the starting local terrain map.

3. The method according to claim 1, wherein the smoothing of the obstacle heights takes into consideration obstacle heights of cells of the starting local terrain map which border the cell for which the ground height is determined.

4. The method according to claim 1, the method further comprising the acts of:
determining a ground surface based on a smoothing of all, or at least a plurality of, obstacle heights of the starting local terrain map;
wherein the determination of the ground height is carried out based on the determined ground surface.

5. The method according to claim 4, wherein the ground surface represents at least partially a sloped planar surface and/or a transition between different planar surfaces.

6. The method according to claim 1, wherein
the obstacle heights of the starting local terrain map and the corrected obstacle heights can in each case also assume an error value which represents that no decisive measurement for the obstacle height is available for the respective cell; and
the corrected obstacle height assumes the error value if the obstacle height of the corresponding cell of the starting local terrain map has the error value.

7. The method according to claim 2, wherein
the obstacle heights of the starting local terrain map and the corrected obstacle heights can in each case also assume an error value which represents that no decisive measurement for the obstacle height is available for the respective cell; and the corrected obstacle height assumes the error value if the obstacle height of the corresponding cell of the starting local terrain map has the error value.

8. The method according to claim 1, wherein each of the cells of the obstacle local terrain map represents in each case the same region of the local terrain as the corresponding cell of the starting local terrain map.

9. The method according to claim 1, the method further comprising the acts of:

providing obstacle point measurements which describe in each case the three-dimensional spatial position of a point in the local terrain of the vehicle, which was identified as an obstacle; and ascertaining the starting local terrain map based on the obstacle point measurements.

10. The method according to claim 8, wherein the obstacle point measurements are obtained with the aid of camera sensors, radar sensors, lidar sensors or ultrasound sensors of the vehicle.

11. A control unit for a vehicle, comprising memory, a processor and electronic interfaces, wherein the control unit is adapted to carry out the method of claim 1.

* * * * *